(12) United States Patent
Antol

(10) Patent No.: US 6,687,287 B1
(45) Date of Patent: Feb. 3, 2004

(54) METHOD AND APPARATUS FOR HANDLING ON-LINE ESCAPE IN MULTIPLE-MODEM CONNECTIONS

(75) Inventor: Shawn R. Antol, Hoffman Estates, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/549,640

(22) Filed: Apr. 14, 2000

(51) Int. Cl.$^7$ ................................................ H04B 1/38
(52) U.S. Cl. ................................................ 375/222
(58) Field of Search ........................... 379/93.01–93.37; 375/222

(56) References Cited

U.S. PATENT DOCUMENTS

| | | | | |
|---|---|---|---|---|
| 5,113,494 A | * | 5/1992 | Menendez et al. | 345/502 |
| 5,335,233 A | * | 8/1994 | Nagy | 714/748 |
| 5,359,648 A | * | 10/1994 | Dunn et al. | 379/93.31 |
| 1,413 A | * | 2/1995 | Gunn | 375/222 |
| 5,530,718 A | * | 6/1996 | Gradeler et al. | 375/222 |
| 5,555,241 A | * | 9/1996 | Lazaridis et al. | 370/389 |
| 6,088,369 A | * | 7/2000 | Dabecki et al. | 370/503 |
| 6,373,885 B1 | * | 4/2002 | Wahl | 375/222 |
| 6,434,169 B1 | * | 8/2002 | Verreault | 370/522 |

FOREIGN PATENT DOCUMENTS

| | | | | |
|---|---|---|---|---|
| JP | 05153279 A | * | 6/1993 | H04M/11/00 |
| JP | 08335987 A | * | 12/1996 | H04M/11/00 |

* cited by examiner

*Primary Examiner*—Paul R. Myers

(57) ABSTRACT

A modem relay connection or other type of connection established between terminals of a communication system includes a series arrangement of multiple modems or other data communication devices. The connection includes two endpoint data communication devices, and at least one non-endpoint data communication device within the serial arrangement between the two endpoint devices. Each of the endpoint data communication devices may have a first type of escape to on-line command mode feature, and the one or more non-endpoint data communication devices are configured so as to have a second type of escape to on-line command mode feature different than the first type of escape to on-line command mode feature. This ensures that entry of the on-line command mode by one of the endpoint devices will not inadvertently disrupt the desired operation of the one or more non-endpoint devices. A given non-endpoint device may be configured to have the escape to on-line command mode feature of the second type by, e.g., altering a command structure of the non-endpoint device, or by appropriate modification of software which detects an escape sequence.

16 Claims, 3 Drawing Sheets

FIG. 3

```
/******************************************************************
Routine : io_at_esc_seq_detected()
Description :
        This routine checks for the at escape sequence to see if
        The user wants to enter on-line command mode.
Parameters in :
        None
Parameters out :
        True        -       if escape sequence is detected
        False       -       if escape not detected
******************************************************************/
byte io_at_esc_seq_detected ( void )
{
        return (FALSE) ;

// The original software in this function has been intentionally removed as it is
        // now rendered useless by the "return" statement above at the top of the
        // function
}
```

METHOD AND APPARATUS FOR HANDLING ON-LINE ESCAPE IN MULTIPLE-MODEM CONNECTIONS

FIELD OF THE INVENTION

The present invention relates generally to data communication systems and devices, and more particularly to modem relay systems and other data communication applications involving multiplemodem connections.

BACKGROUND OF THE INVENTION

FIG. 1 shows an example of a conventional data communication system 10 which includes a first computer 12 and a second computer 14. The first and second computers 12, 14 communicate with one another over a two-modem connection which in this example includes: a first modem 15 associated with the first computer 12; a transport medium 16; and a second modem 17 associated with the second computer 14. The transport medium 16 may include, e.g., one or more telephone lines or other communication lines associated with a Public Switched Telephone Network (PSTN), a Private Branch Exchange (PBX), a telephone line simulator (TLS), leased lines, or a portion or combination of these and other wired or wireless systems and devices. The modems 15, 17 in this conventional arrangement allow the computers 12, 14 to exchange information over the transport medium 16. As is typical, the arrangement shown in this example includes only two modems, each associated with one of the computers on a given end of the connection.

The V.24 Series Recommendation of the International Telecommunications Union-Telecommunication (ITU-T) Standardization Sector defines the signals communicated between Data Circuit Terminating Equipment (DCE) and Data Terminal Equipment (DTE) in systems such as that shown in FIG. 1. For example, in the system 10, both of the modems 15, 17 are each considered DCE, while the computers 12, 14 are each considered DTE. In accordance with the V.24. Recommendation, upon establishment of a connection capable of passing DTE-to-DTE user data, the DCE are considered to be on-line and in data mode. When off-line, or not-connected to other DCE, the DCE are said to be in command mode. A third condition can exist whereby the two endpoint DCE are on-line and in data mode, but one of the DTE has requested its near-end DCE to enter an on-line command mode. This third condition, commonly referred to as "escape to on-line command mode," allows the requesting DTE to issue post-connect commands to its near-end DCE. Such commands may be used, e.g., to reconfigure the DCE, to request that the DCE disconnect, or to request that the DCE reenter on-line data mode.

After completion of data transmission through the system, the DTE on each end of the connection instructs its corresponding DCE to initiate a line disconnect sequence to electronically disengage itself from the communication line.

The data communications industry has adopted two methods of invoking a DTE-to-DCE line disconnect sequence. The first is via a hardware signaling mechanism described in ITU-T V.24 Series 108/2, and the second is by sending an escape to on-line command mode character sequence, followed by a command to disconnect the DCE from the communication line.

An end user or a suitable mechanism associated therewith, such as a DTE application program, an operating system, a Basic Input Output System (BIOS), or other software element, may initiate the escape to on-line command mode and the DTE-to-DCE line disconnect sequence. More specifically, a certain known sequence of characters, e.g., three consecutive plus characters ("+++") appropriately timed, may be issued in order to force a modem or other DCE to enter on-line command mode while the DCE is in a data mode. As previously noted, the on-line command mode feature allows post-connect or data mode DCE reconfirmation. The DTE-to-DCE line disconnect is similarly generated by issuing three consecutive plus characters ("+++") followed by an ATH command. For example, the dial-up networking feature of the Microsoft Windows™ operating system is known to issue three plus characters ("+++") followed by an ATH command in order to instruct the DCE to disconnect from the communication line.

The above-described conventional techniques can cause significant problems in certain communication systems, such as modem relay systems, that incorporate a series arrangement or chain of more than two DCE in a given DTE-to-DTE connection. More particularly, issuing the escape to on-line command mode sequence for one of the DCE in the chain may cause the other DCE in the chain to also enter on-line mode. This is undesirable because the DCE initiating the escape to on-line command mode will then have no way to instruct other DCE further down the chain with regard to subsequent commands or configuration settings, such as returning to a data mode, or terminating a connection. Such a situation can lead the system to become disjoint, with some DCE in on-line command mode and others in data mode, resulting in complications such as network equipment availability issues, potential under-billing or over-billing of communications, and fraudulent communications.

One possible solution to this problem is to disable the escape to on-line command mode entirely, for all of the DCE in the chain. However, this solution is inadequate in that it would prevent any of the DCE in the chain from obtaining the substantial benefits generally associated with that mode.

A need therefore exists for techniques for handling the above-described escape to on-line command mode in a manner that avoids the problems which can occur in connections involving chains of more than two modems or other DCE, without requiring that the mode be disabled for all the DCE in the chain.

SUMMARY OF THE INVENTION

The invention provides improved techniques for handling escape to on-line command mode in multiple-modem connections.

In accordance with the invention, a modem relay connection or other type of connection established between terminals of a communication system includes a series arrangement of multiple modems or other data communication devices. The connection includes two endpoint data communication devices, and at least one non-endpoint data communication device within the serial arrangement between the two endpoint devices. Each of the endpoint data communication devices has a first type of escape to on-line command mode feature, and the one or more non-endpoint data communication devices are each configured so as to have a second type of escape to on-line command mode feature different than the first type of escape to on-line command mode feature. This ensures that entry of the on-line command mode by one of the endpoint devices will not inadvertently disrupt the desired operation of the one or more non-endpoint devices.

The non-endpoint device may be configured to have the escape to on-line command mode feature of the second type by altering a command structure of the non-endpoint device. In one possible implementation, a register setting which is associated with the non-endpoint data communication device and utilized to implement the escape to on-line command mode feature may be changed from a default value associated with the escape to on-line command mode feature of the first type to a different value associated with the escape to on-line command mode of the second type.

As another example, the non-endpoint device may be configured to have the escape to on-line command mode feature of the second type by appropriate modification of software which detects an escape sequence. More particularly, the software may be altered by forcing a detection routine of the escape to on-line command mode to return a specified value associated with non-detection of an escape sequence.

The invention avoids the above-noted problems associated with conventional multi-modem connections, and can be used with a variety of different escape to on-line command mode features, including both time-dependent and time-independent features. These and other features and advantages of the present invention will become more apparent from the accompanying drawings and the following detailed description.

BRIEF DESCRIPTION OF THE DRAWINGS

FIG. 3 shows a set of software code suitable for implementing an escape to on-line command mode feature in an illustrative embodiment of the invention.

DETAILED DESCRIPTION OF THE INVENTION

The present invention will be illustrated below in conjunction with exemplary communication systems which include communication line connections involving a series connection or chain of more than two modems. It should be emphasized, however, that the disclosed escape to on-line command mode techniques of the invention are suitable for use with a wide variety of different types of systems including, e.g., Internet protocol (IP) systems, asymmetric digital subscriber line (ADSL) systems, asynchronous transfer mode (ATM) systems, synchronous optical network (Sonet)/synchronous digital hierarchy (SDH) systems, wireless networks, etc. In addition, although illustrated using modems, the invention is more broadly applicable to other types of data communication equipment. Furthermore, the invention can be used with many different types of escape to on-line command mode features, including both time-dependent and time-independent features, and a variety of data communication standards.

Figure 1:
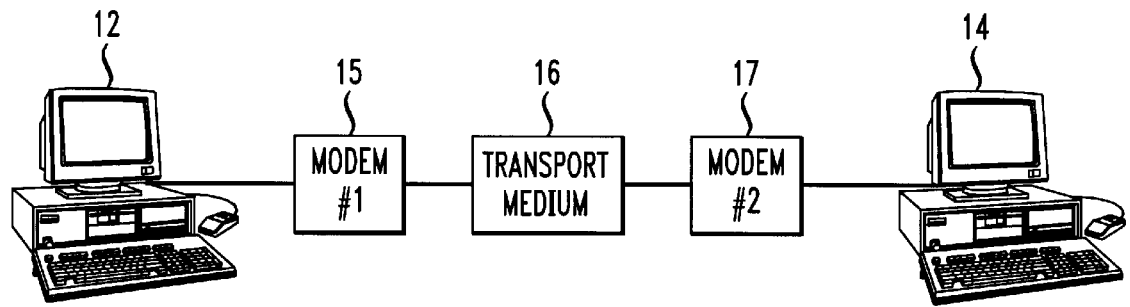
FIG. 1 is a block diagram of a conventional two-modem connection in a communication system.
Figure 2:
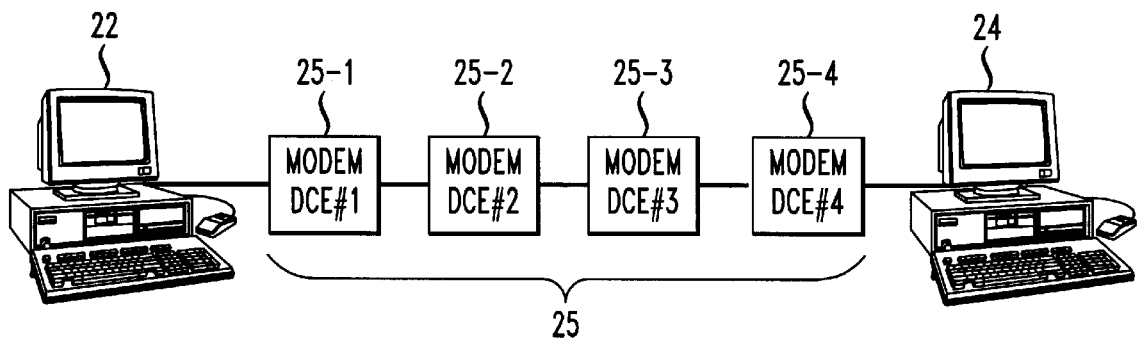
FIG. 2 is a block diagram of a communication system having a connection comprising a chain of four modems, and which incorporates an escape to on-line command mode feature in accordance with the present invention.

FIG. 2 shows an example of a data communication system 20 which incorporates an escape to on-line command mode feature in accordance with the present invention. The system 20 includes a first computer 22 and a second computer 24. The first and second computers 22, 24 communicate with one another over a modem relay connection 25 which in this example includes a series connection or chain of four modems 25-1, 25-2, 25-3 and 25-4 as shown. The first modem 25-1 is associated with the first computer 22 and the fourth modem 25-4 is associated with the second computer 24.

The second and third modems 25-2 and 25-3 are part of a modem relay portion of a transport medium which is used to support communication between the computers 22, 24. This transport medium may include other elements not explicitly shown, such as, e.g., one or more telephone lines or other communication lines associated with a Public Switched Telephone Network (PSTN), a Private Branch Exchange (PBX), a telephone line simulator (TLS), leased lines, or suitable portions or combinations of these and other well-known wired or wireless systems and devices.

The modems 25-1 through 25-4 are each considered Data Circuit Terminating Equipment (DCE), while the computers 22, 24 are each considered Data Terminal Equipment (DTE), in accordance with, e.g., the terminology of the above-noted V.24 Series Recommendation of the International Telecommunications Union-Telecommunication (ITU-T) Standardization Sector. It should be noted, however, that the invention is not limited to use with the V.24 Recommendation, but is more generally applicable to a wide variety of communication standards. The V.24 Recommendation is thus referred to herein for purposes of illustration only.

As previously noted, the V.24 Recommendation further specifies that, upon establishment of a connection capable of passing DTE-to-DTE user data, the DCE are considered to be on-line and in data mode. When off-line, or not connected to other DCE, the DCE are said to be in command mode. One or more of the DCE may also be able to enter an escape to on-line command mode, in the manner described below.

In accordance with the present invention, the DCE of the modem relay connection 25 of FIG. 2 are configured such that only the endpoint DCE, i.e., modems 25-1 and 25-4, are permitted to utilize a particular type of escape to-on-line command mode. As previously noted, this mode allows a requesting DTE to issue post-connect commands to its near-end DCE. Such commands may be used, e.g., to reconfigure the DCE, to request that the DCE disconnect, or to request that the DCE reenter on-line data mode. The escape to on-line command mode of the remaining DCE of the modem relay connection 25, i.e., modems 25-2 and 25-3, are configured so as to utilize a different escape to on-line command mode function than that of the endpoint DCE.

For example, the non-endpoint modems 25-2 and 25-3 may utilize an escape to on-line command mode which is entered via a different command structure. More specifically, if the endpoint modems 25-1 and 25-4 are configured with a conventional escape to on-line command structure such as the three plus characters ("+++") appropriately timed, the non-endpoint modems 25-2 and 25-3 may be configured to utilize a different escape to on-line command structure, e.g., a different sequence of characters, different timing, etc.

One particular implementation of the above-described alteration of the escape to on-line command structure in the non-endpoint DCE is as follows. Most modem vendors offer an escape to on-line command mode feature which is implemented in their chipsets and its corresponding software. For example, such a feature is provided in software for use with the Venus® modem chipset available from Lucent Technologies Inc. Microelectronics Group of Allentown, Pa. In this modem software, a so-called S-register is used to store an escape to on-line command mode character which is to be recognized in a particular sequence in order to activate the mode. The particular S-register typically used in practice is the S-register S2, and the default value of S-register S2 in the Lucent Technologies modem software and that of other vendors is set to decimal 43, which corresponds to the "+" character. An S-register is also typically used to store a value specifying the required timing between the characters in the sequence. For example, the above-noted Lucent Technologies modem software uses S-register S12 with a default timing value of 50 milliseconds. Additional details regarding the Lucent Technologies modem software may be found in the Venus® AT Command Reference Manual, Lucent Technologies Inc. Microelectronics Group, Allentown, Pa. October 1999, which is incorporated by reference herein.

In accordance with the present invention, the value stored in S-register S2 may be changed from the default decimal 43 value to another value. Advantageously, this approach ensures that the escape to on-line command mode feature still exists in the corresponding DCE, but will not interfere with the functionality of the two DCE on the connection endpoints. A similar approach may be applied using other registers and stored values in alternative embodiments of the invention.

As another example of a possible modification of the escape to on-line command mode in accordance with the present invention, this mode in the non-endpoint modems 25-2 and 25-3 may be completely disabled. As previously noted, most modem vendors offer an escape to on-line command mode feature which is implemented in their chipsets and its corresponding software. Therefore, in accordance with the invention, this feature can be disabled for non-endpoint DCE by an appropriate modification to the modem software.

FIG. 3 shows an example of a software fragment from the above-noted Venus® modem chipset software. This fragment includes a routine $io_{13}at_{13}esc_{13}seq_{13}detected( )$ which checks for an escape to on-line command mode sequence in order to determine if a user wants to enter the on-line command mode. The escape to on-line command mode is disabled in this software fragment by modifying the routine as shown to include a return (FALSE) statement, which effectively ensures that the escape to on-line command mode sequence will not be detected in the corresponding DCE regardless of the particular characters that are transmitted.

Advantageously, the modem relay connection 25 configured in the manner described above is not susceptible to the above-identified problems of the conventional approach. More particularly, issuing the escape to on-line command mode sequence for one of the endpoint DCE 25-1 or 25-4 in the modem relay connection 25 will not cause the other DCE in the chain to also enter on-line mode.

The system 20 of the present invention is therefore not susceptible to the DCE becoming disjoint, with some DCE in on-line command mode and others in data mode, and thereby avoids the above-noted complications associated with network equipment availability, potential under-billing or over-billing of communications, and fraudulent communications. Moreover, the present invention avoids the need to disable the escape to on-line command mode entirely, for all of the DCE in the chain, and thus preserves the substantial benefits generally associated with that mode for at least the endpoint DCE, and potentially all of the DCE in the modem relay connection.

It should be appreciated that while the modem relay connection 25 in system 20 includes four modems, the techniques of the invention are more generally applicable to connections which include any number of DCE.

Figure 4:
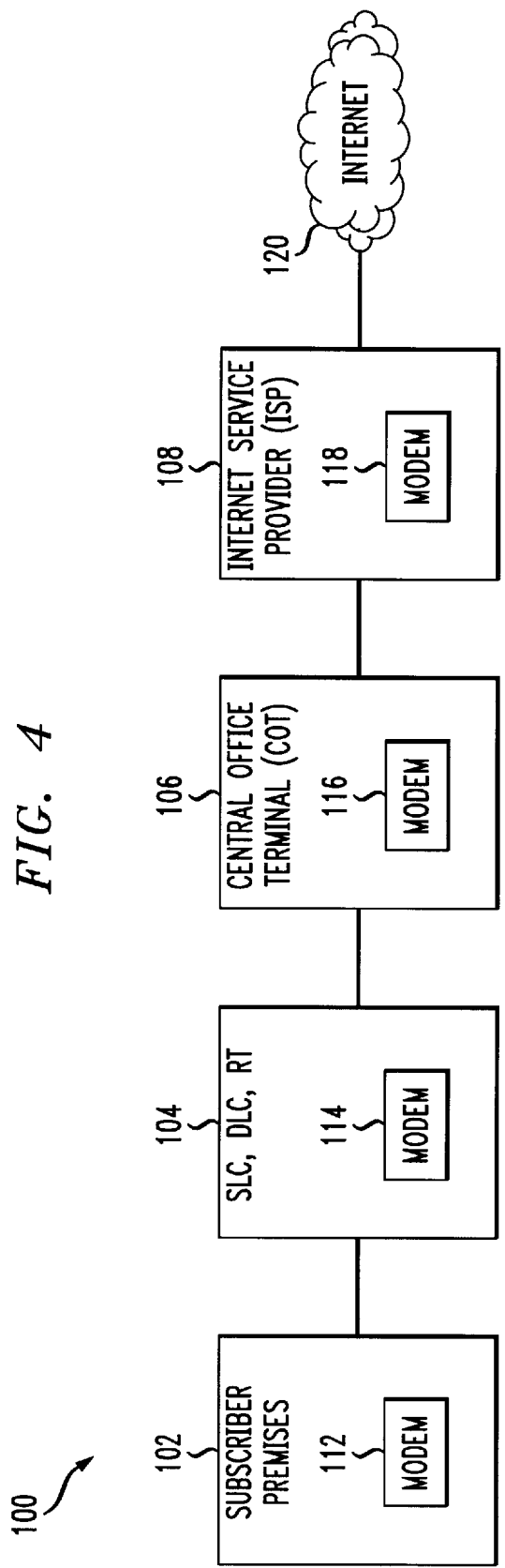
FIG. 4 shows another example of a communication system which incorporates an escape to on-line command mode feature in accordance with the present invention.

FIG. 4 shows another example of a communication system 100 in which the present invention may be implemented. The system 100 includes a subscriber premises device 102, a remote access server (RAS) device 104 which may be, e.g., a subscriber line carrier (SLC), a digital loop carrier (DLC), or a remote terminal (RT), a central office terminal (COT) 106, and an Internet service provider (ISP) 108. The subscriber premises device 102, remote access server device 104, COT 106 and ISP 108 are equipped with modems 112,114,116 and 118, respectively. One or more of the modems, e.g., modems 114 and 118, may be remote access server (RAS) modems, while one or more of the remaining modems, e.g., modem 116, may be client modems. The ISP 108 is coupled as shown to the Internet 120. The connections between the devices 102, 104, 106 and 108 may be via telephone line, digital subscriber line (DSL), integrated services digital network (ISDN) line, as well as combinations of these and other conventional wired or wireless communication lines.

In the system 100, communications are established between the subscriber premises device 102 and the Internet 120 via a modem relay connection which includes the modems 112, 114, 116 and 118. Although not shown in FIG. 4, a server or other device associated with the Internet 120 includes a modem or similar DCE which represents an endpoint of the modem relay connection. The modem 112 associated with the subscriber premises device 102 is the other endpoint of the connection.

In accordance with the invention, the modems in the modem relay connection other than the endpoint modems are configured so as to utilize a different type of escape to on-line command mode function than that of the endpoint modems. More specifically, as described in greater detail above, the escape to on-line command mode functionality of the non-endpoint modems may be altered so as to utilize a different command structure, or may be disabled completely through appropriate software or hardware modifications. The system 100 is thereby provided with advantages similar to those described above for system 20.

The above-described embodiments of the invention are intended to be illustrative only. For example, it will be recognized that many alternative configurations are possible for systems 20 and 100, e.g., using elements other than those shown in FIGS. 2 and 4, and it should be understood that the invention is not restricted to use with any particular system configuration. In addition, the invention is not limited to use with modems, but is more generally applicable to any type of communication device or system having an escape to on-line command functionality. For example, as previously noted, the invention can be used with communication devices having a time-independent escape to on-line command mode feature. Moreover, the invention can be implemented in whole or in part in software stored on a machine-readable medium, e.g., an electronic memory, a disk-based or card-based storage device, etc., and executed by a processor associated with a modem, computer or other processor-based device in a communication system. Numerous alternative embodiments within the scope of the following claims will be apparent to those skilled in the art.

What is claimed is:

1. An apparatus for use in establishing a connection between terminals of a communication system, the connection comprising a serial arrangement of a plurality of data communication devices including two endpoint data communication devices, the apparatus comprising:

at least one non-endpoint data communication device arranged within the serial arrangement of the plurality of data communication devices between the two endpoint data communication devices, wherein at least one of the endpoint data communication devices has a first type of escape to on-line command mode feature, and the non-endpoint data communication device is configured so as to have a second type of escape to on-line command mode feature different than the first type of escape to on-line command mode feature;

wherein the at least one non-endpoint data communication device is configured to have the escape to on-line command mode feature of the second type by altering software which is associated with the non-endpoint data communication device and utilized to implement the escape to on-line command mode feature; and wherein the software is altered by forcing a detection routine of the escape to on-line command mode to return a specified value associated with non-detection of an escape sequence.

2. The apparatus of claim 1 wherein at least a subset of the endpoint and non-endpoint data communication devices comprise modems.

3. The apparatus of claim 1 wherein the connection comprising the serial arrangement of the plurality of data communication devices includes a plurality of non-endpoint data communication devices arranged in series between the endpoint data communication devices, each of the plurality of non-endpoint data communication devices being configured to have the second type of escape to on-line command mode feature.

4. The apparatus of claim 1 wherein each of the plurality of data communication devices comprises a modem and the connection comprises a modem relay connection.

5. The apparatus of claim 1 wherein at least one of the first and second types of escape to on-line command mode features comprises a time-dependent escape to on-line command mode feature.

6. The apparatus of claim 1 wherein at least one of the first and second types of escape to on-line command mode features comprises a time-independent escape to on-line command mode feature.

7. An apparatus for use in establishing a connection between terminals of a communication system, the connection comprising a serial arrangement of a plurality of data communication devices including two endpoint data communication devices, the apparatus comprising:

at least one non-endpoint data communication device arranged within the serial arrangement of the plurality of data communication devices between the two endpoint data communication devices, wherein at least one of the endpoint data communication devices has a first type of escape to on-line command mode feature, and the non-endpoint data communication device is configured so as to have a second type of escape to on-line command mode feature different than the first type of escape to on-line command mode feature;

wherein the at least one non-endpoint data communication device is configured to have the escape to on-line command mode feature of the second type by altering a register setting which is associated with the non-endpoint data communication device and utilized to implement the escape to on-line command mode feature; and wherein the register setting is changed from a default value associated with the escape to on-line command mode feature of the first type to a different value associated with the escape to on-line command mode feature of the second type.

8. The apparatus of claim 1 wherein the escape to on-line command mode feature of the first type utilizes a different activation command structure than the escape to on-line command mode feature of the second type.

9. A method for use in establishing a connection between terminals of a communication system, the connection comprising a serial arrangement of a plurality of data communication devices including two endpoint data communication devices, the method comprising the steps of:

determining a first type of escape to on-line command mode feature associated with at least one of the endpoint data communication devices; and configuring at least one non-endpoint data communication device arranged within the serial arrangement of the plurality of data communication devices between the two endpoint data communication devices so as to have a second type of escape to on-line command mode feature different than the first type of escape to on-line command mode feature;

wherein the at least one non-endpoint data communication device is configured to have the escape to on-line command mode feature of the second type by altering software which is associated with the non-endpoint data communication device and utilized to implement the escape to on-line command mode feature; and wherein the software is altered by forcing a detection routine of the escape to on-line command mode to return a specified value associated with non-detection of an escape sequence.

10. The method of claim 9 wherein at least a subset of the endpoint and non-endpoint data communication devices comprise modems.

11. The method of claim 9 wherein the connection comprising the serial arrangement of the plurality of data communication devices includes a plurality of non-endpoint data communication devices arranged in series between the endpoint data communication devices, each of the plurality of non-endpoint data communication devices being configured to have the second type of escape to on-line command mode feature.

12. The method of claim 9 wherein each of the plurality of data communication devices comprises a modem and the connection comprises a modem relay connection.

13. The method of claim 9 wherein at least one of the first and second types of escape to on-line command mode features comprises a time-dependent escape to on-line command mode feature.

14. The method of claim 9 wherein at least one of the first and second types of escape to on-line command mode features comprises a time-independent escape to on-line command mode feature.

15. A method for use in establishing a connection between terminals of a communication system, the connection comprising a serial arrangement of a plurality of data communication devices including two endpoint data communication devices, the method comprising the steps of:

determining a first type of escape to on-line command mode feature associated with at least one of the endpoint data communication devices; and configuring at least one non-endpoint data communication device arranged within the serial arrangement of the plurality of data communication devices between the two endpoint data communication devices so as to have a second type of escape to on-line command mode feature different than the first type of escape to on-line command mode feature;

wherein the at least one non-endpoint data communication device is configured to have the escape to on-line command mode feature of the second type by altering a register setting which is associated with the non-endpoint data communication device and utilized to implement the escape to on-line command mode feature; and wherein the register setting is changed from a default value associated with the escape to on-line command mode feature of the first type to a different value associated with the escape to on-line command mode feature of the second type.

16. The method of claim 9 wherein the escape to on-line command mode feature of the first type utilizes a different activation command structure than the escape to on-line command mode feature of the second type.

* * * * *